US010501300B2

(12) United States Patent
Bethune et al.

(10) Patent No.: US 10,501,300 B2
(45) Date of Patent: Dec. 10, 2019

(54) AMPOULE OPENER

(71) Applicants: John Bethune, Hinesburg, VT (US); Jon Bondy, Fletcher, VT (US)

(72) Inventors: John Bethune, Hinesburg, VT (US); Jon Bondy, Fletcher, VT (US)

( * ) Notice: Subject to any disclaimer, the term of this patent is extended or adjusted under 35 U.S.C. 154(b) by 0 days.

(21) Appl. No.: 15/507,268

(22) PCT Filed: Aug. 28, 2015

(86) PCT No.: PCT/US2015/047392
§ 371 (c)(1),
(2) Date: Feb. 28, 2017

(87) PCT Pub. No.: WO2016/033433
PCT Pub. Date: Mar. 3, 2016

(65) Prior Publication Data
US 2017/0283232 A1 Oct. 5, 2017

Related U.S. Application Data

(60) Provisional application No. 62/043,768, filed on Aug. 29, 2014.

(51) Int. Cl.
*B67B 7/92* (2006.01)
*B23D 31/00* (2006.01)

(52) U.S. Cl.
CPC .............. *B67B 7/92* (2013.01); *B23D 31/002* (2013.01)

(58) Field of Classification Search
CPC ......... A61J 1/065; A61J 1/06; Y10T 225/321; Y10T 225/325; Y10T 225/329; Y10T 225/371; Y10T 225/30; B67B 7/92; B23D 31/002
See application file for complete search history.

(56) References Cited

U.S. PATENT DOCUMENTS

| 3,380,636 A | 4/1968 | Ushkow et al. |
| 3,450,319 A | 6/1969 | Ray et al. |
| 4,304,869 A * | 12/1981 | Dyke .................. A61M 35/006 206/219 |

(Continued)

FOREIGN PATENT DOCUMENTS

| DE | 3504324 A1 | 8/1986 |
| FR | 2649680 B1 | 10/1991 |

OTHER PUBLICATIONS

Copenheaver, "International Search Report", related to International Application No. PCT/US2015/047392, dated Oct. 20, 2015.

(Continued)

*Primary Examiner* — Phong H Nguyen
(74) *Attorney, Agent, or Firm* — Justin W. McCabe, Esq.; Dunkiel Saunders Elliott Raubvogel & Hand, PLLC (57) ABSTRACT

A device for opening a sealed glass ampoule includes a housing that aligns the ampoule with a breaking mechanism. The breaking mechanism includes a sloped region that corresponds to the ampoule to be broken. After breakage of the ampoule, the ampoule head is stored in a storage area and can be removed later without the user having to touch the broken glass. The ampoule opener can be used with a mating base or on a countertop or other flat surface. The ampoule opener removes the need for the user to touch the ampoule during or after opening.

19 Claims, 13 Drawing Sheets

(56) References Cited

U.S. PATENT DOCUMENTS

| | | | |
|---|---|---|---|
| 4,528,268 A * | 7/1985 | Andersen | C12Q 1/22 |
| | | | 206/219 |
| 5,129,566 A | 7/1992 | Ogden et al. | |
| 5,288,159 A * | 2/1994 | Wirt | A61M 35/006 |
| | | | 206/532 |
| 6,099,510 A | 8/2000 | Ruther et al. | |
| 6,244,487 B1 | 6/2001 | Murray | |
| 8,448,830 B2 | 5/2013 | Starr | |
| 2013/0032623 A1 | 2/2013 | Kayser | |

OTHER PUBLICATIONS

Albuquerque, "Examination Report No. 1 for Standard Patent Application", related to Australian Application No. 2015308762, dated May 29, 2019.

IP Australia, "Notice of acceptance for patent application", regarding Australian Application No. 2015308762, dated Jul. 17, 2019.

Koch, "First Amendment", regarding Australian Application No. 2015308762, Jul. 7, 2019.

\* cited by examiner

AMPOULE OPENER

RELATED APPLICATION DATA

This application claims the benefit of U.S. Provisional Application Ser. No. 62/043,768, filed Aug. 29, 2014 and titled "Ampoule Opener", which is hereby incorporated by reference herein in its entirety.

FIELD OF THE INVENTION

The present invention generally relates to medical devices. In particular, the present invention is directed to an Ampoule Opener.

BACKGROUND

Ampoules are often used, particularly in medicine and chemistry, to store fluid products, for example medicinal products or aggressive substances such as monomers, in a sterile manner and protected against diffusion. Conventional ampoules are generally made of glass and have an interior where the fluid product is stored and which is entirely closed off with regard to the exterior. Such ampoules are usually elongated and have an ampoule head and an ampoule body which are connected to each other by way of a narrow ampoule neck. Immediately before using the fluid product the ampoule head is broken off from the ampoule body in the area of the ampoule neck, at a predetermined break point, so that the fluid product can be subsequently removed from the ampoule.

Various types of devices are known for breaking the ampoule head off from the ampoule body. These devices make it easier for the user to break the ampoule head off from the ampoule body and to separate the resulting glass splinters from the fluid product. In addition, the spilling of part of the fluid product when breaking the ampoule is avoided. Unfortunately, despite the existence of these devices, the threat of injury (to the user breaking the ampoule) and/or loss of medicine persists.

SUMMARY OF THE DISCLOSURE

In a first exemplary aspect an ampoule opener for breaking the head off an ampoule at a predetermined location comprises a housing including a keyway; a channel extending from the keyway to a breaking mechanism, wherein the breaking mechanism includes a slope region having an angle and length that corresponds to the head of the ampoule; and a storage, wherein the storage is formed within the housing and in communication with the channel, and wherein the storage receives the head of the ampoule after broken off the ampoule.

In another exemplary aspect, an ampoule opening system for breaking the head off an ampoule at a predetermined location comprises an ampoule opener including: a housing including a keyway; a channel extending from the keyway to a breaking mechanism, wherein the breaking mechanism includes a slope region having an angle and length that corresponds to the head of the ampoule; and a storage, wherein the storage is formed within the housing and in communication with the channel, and wherein the storage receives the head of the ampoule after broken off the ampoule; and a base including a plurality of receivers, wherein at least one of the receivers supports the ampoule before and after breaking the head of the ampoule with the ampoule opener.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

An ampoule opener according to the present disclosure provides for secure opening of an ampoule. The ampoule opener is a safe, reliable, convenient device that consistently properly breaks the tops off a sealed ampoule without exposing the user to the sharp edges of either the broken top or the lower portion of the ampoule. The ampoule opener is also adaptable to either bench top use or with a mounted stand, with the mounted stand providing for a station where secure extraction of the liquid contained within the ampoule can be removed by a user.

Figure 1:
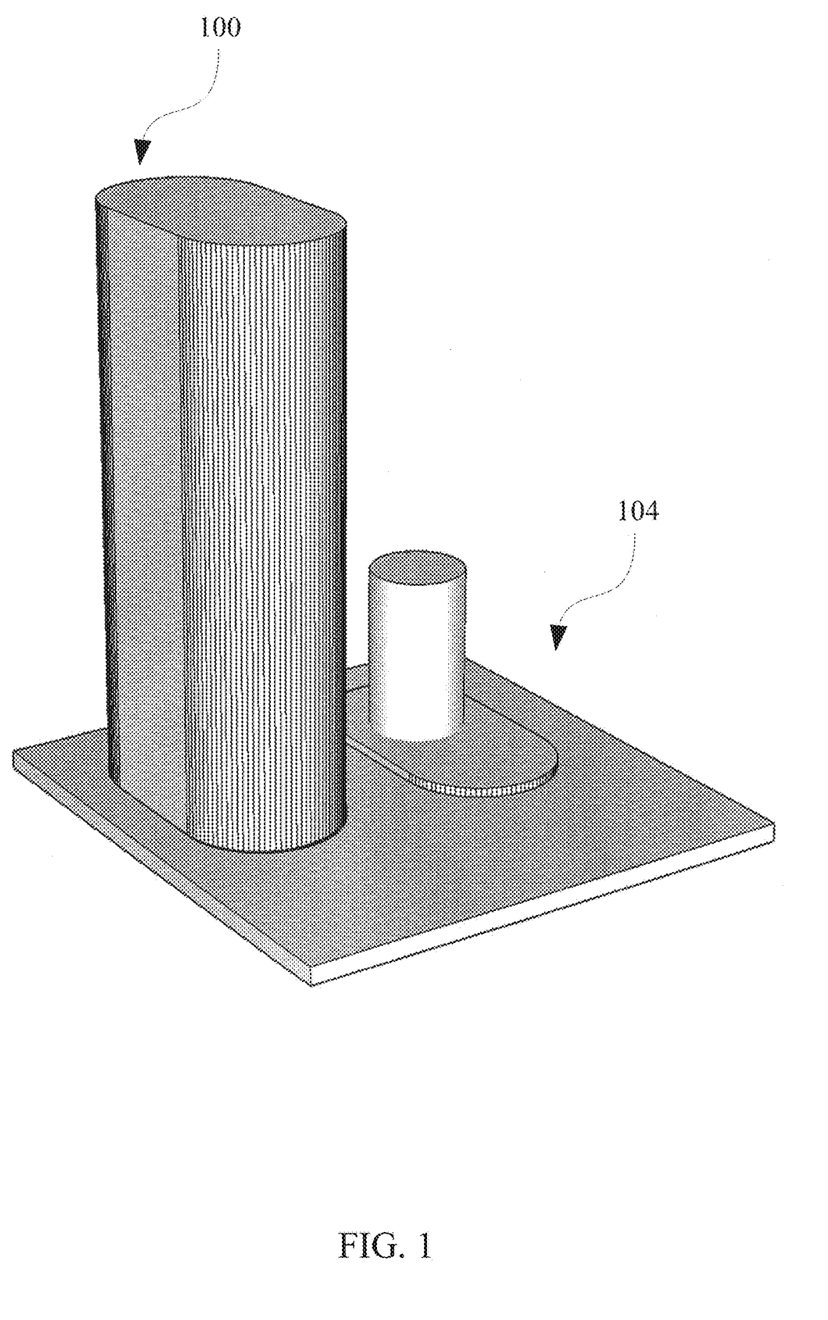
FIG. 1 is a perspective view of an exemplary ampoule opener arranged on a base according to an embodiment of the present invention.
Figure 2:
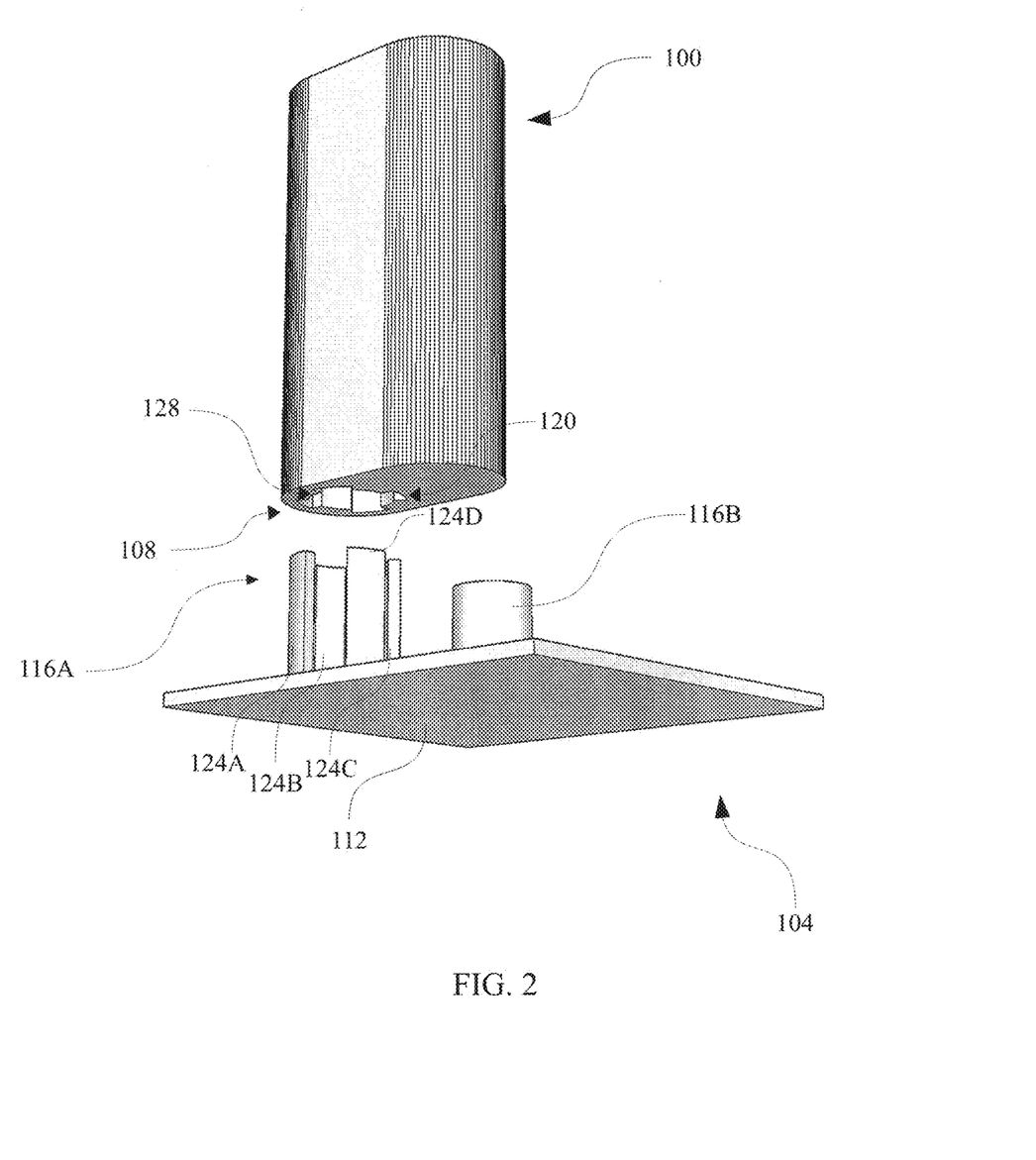
FIG. 2 is a perspective view of the exemplary ampoule opener of FIG. 1, with the ampoule opener separated from the base according to an embodiment of the present invention.

Turning now to the figures, FIGS. 1 and 2 show an exemplary ampoule opener 100 releaseably coupled to a base 104. As shown, ampoule opener 100 is generally shaped as an ovoid, although other shapes could be used, e.g., rectangular prisms, cuboids, etc. The ovoid is well adapted to use as an ampoule opener as it provides internal capacity for the broken ampoule heads as well as a keyway 108 (shown in FIG. 2) leading to where the breaking mechanism is contained, while providing a reliable and comfortable grip for the user's hand. (The internal portions of ampoule opener 100 are discussed in more detail with reference to FIG. 3). The size and configuration of ampoule opener 100 is generally dependent on the size of the ampoule to be opened and the dimensions of the head of the ampoule.

Base 104 has a platform 112 and one or more receivers 116, e.g., receivers 116A-B. Platform 112 can be of any size and configuration so as to provide a location for receivers 116A-B and to support the ampoule opener 100. At least one of receivers 116A-B is configured so as to mate with keyway 108. As shown in FIG. 2, keyway 108 includes four slots 120A-D and receiver 116A has four extending flanges 124A-D that are sized and configured to mate with slots 120A-D. In the embodiment shown in FIG. 2, receiver 116B is generally circular and is sized and configured to mate with inner portion 128 of keyway 108. In the embodiment shown in FIGS. 1 and 2, a user places an unopened ampoule into receiver 116A and uses ampoule opener 100 to open the ampoule by aligning extending flanges 124A-D with keyway 108 and sliding the ampoule opener down to platform 112. With the head of the ampoule now broken, the user slides ampoule opener 100 away from platform 112 and places the ampoule opener on receiver 116B (aligning inner portion 128 with receiver 116B) for later use. The user can then remove the ampoule or the contents of the ampoule.

Figure 3:
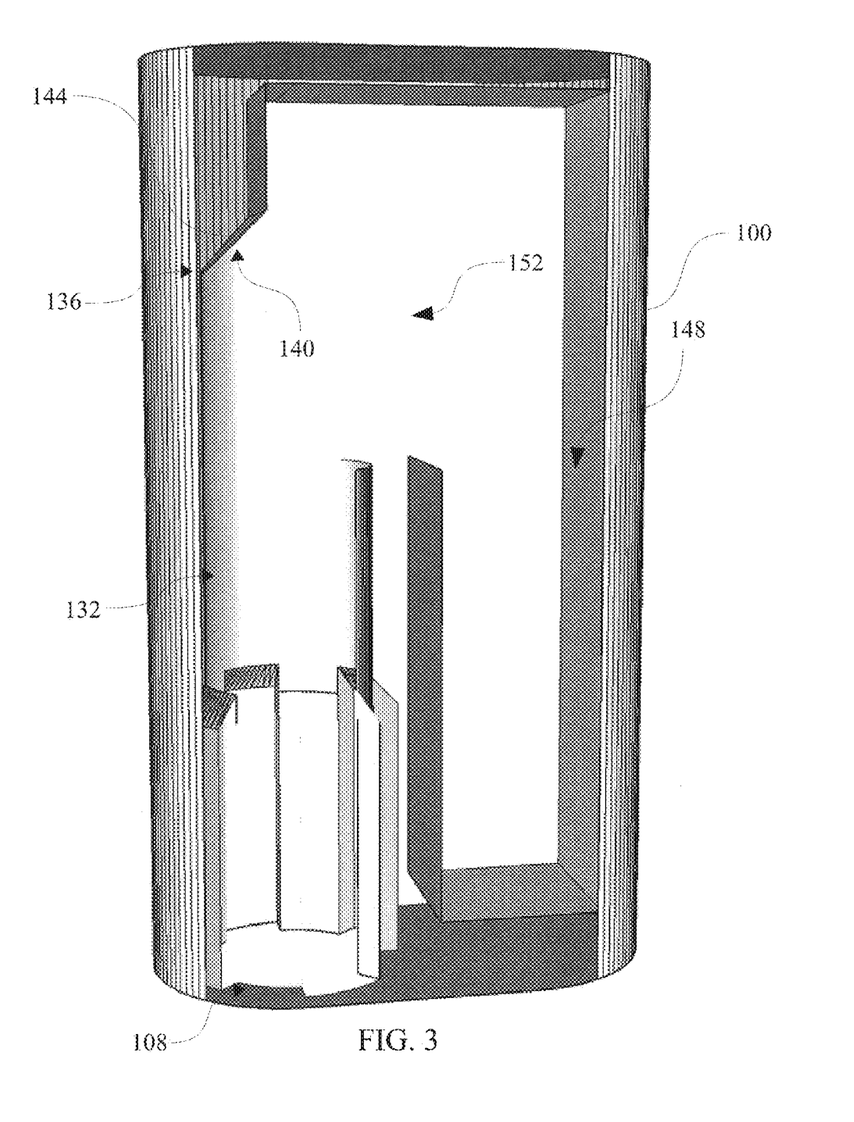
FIG. 3 is a cut-away view of an exemplary ampoule opener according to an embodiment of the present invention.

Turning now to FIG. 3, there is shown a cut-away view of ampoule opener 100. As shown, ampoule opener 100 includes a channel 132 extending away from the entrance of keyway 108. Proximate the distal end of channel 132, i.e., end 136, is a breaking mechanism 140. In this embodiment, breaking mechanism 140 is a sloped region 144 with a predetermined angle and length corresponding to the ampoule to be broken. In use, as the user slides ampoule opener 100 to platform 112 (when used) or onto a counter, the head of the ampoule contacts sloped region 144 and eventually breaks as the head travels further toward the end of the sloped region. As noted above, the fracture point for the head of many ampoules is at a predetermined location, which is typically scored at least partially. So as to break the head at the preferred location, slope region 144 and channel 132 are sized and configured for discrete types and sizes of ampoules (best seen in FIGS. 8A-8C).

Ampoule opener also includes a storage 148, which holds the broken heads of the ampoules. In use, as the user slides ampoule opener 100 toward platform 112 and the ampoule head breaks on breaking mechanism 140, the head is positioned to fall into storage 148 so that upon removal of the ampoule opener from the platform, the ampoule head remains in the ampoule opener. The broken heads can be safely removed by upending ampoule opener 100 so that the ampoule heads fall toward a storage opening 152, then rotating the ampoule opener such that the ampoule head(s) are positioned to fall through channel 132 (and into an appropriate disposal container) once the ampoule opener is returned to its usable position.

Although the embodiment of ampoule opener 100 included a base 104, ampoule opener 100 can be used on any flat surface or countertop that allows for the ampoule to be broken to remain in an upright position.

Figure 4:
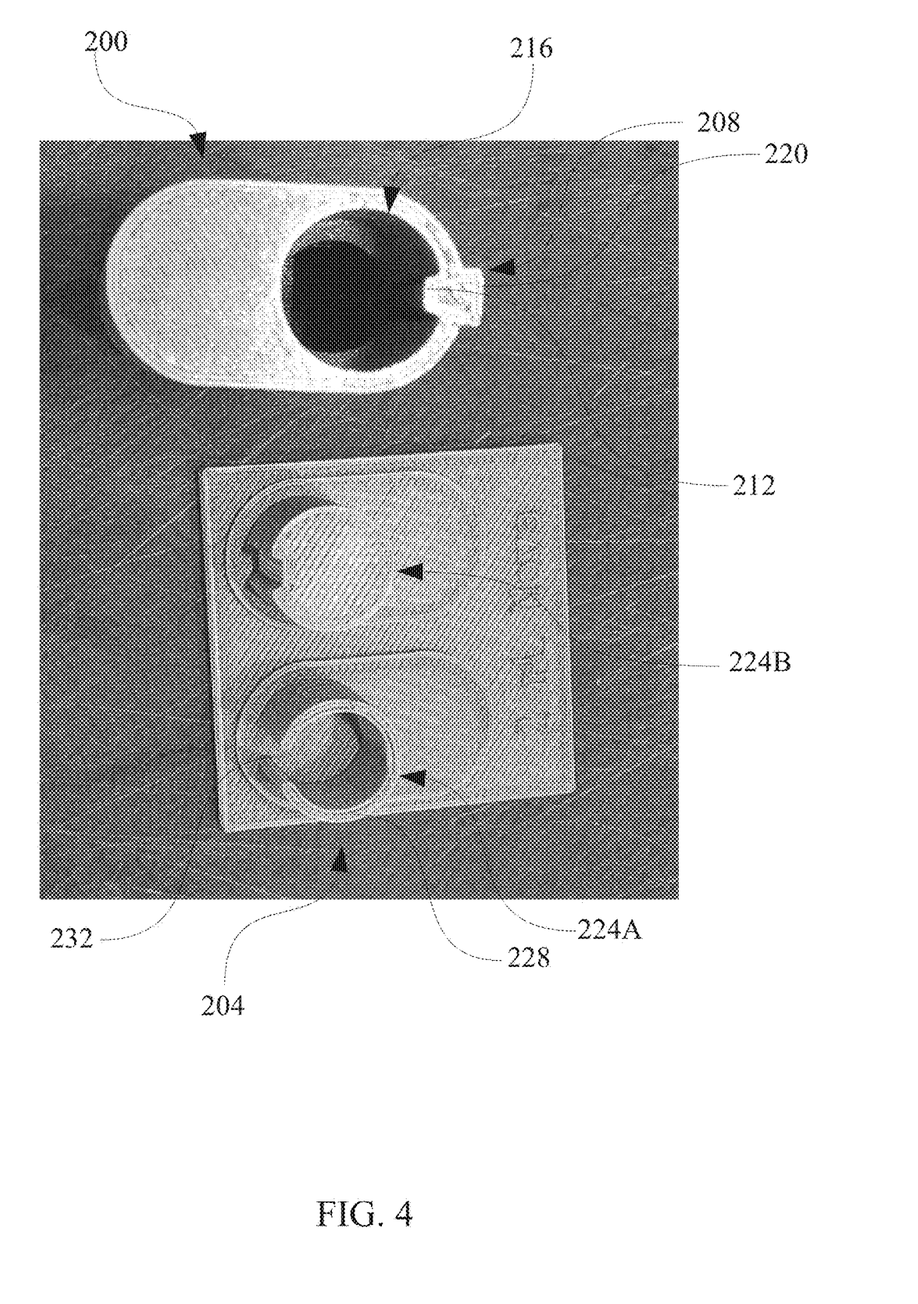
FIG. 4 is a perspective view of another exemplary ampoule opener with a base according to an embodiment of the present invention.

Turning now to FIG. 4, there is shown another exemplary embodiment of an ampoule opener, ampoule opener 200, and base 204. The primary difference between ampoule opener 200 and ampoule opener 100, discussed above, is keyway 208. As shown, keyway 208 is a first protrusion 212 that travels within a channel 216 of ampoule opener 200 and a second protrusion 220 that is external to channel 216. Base 204 includes a pair of receivers 224 (receivers 224A and B, although more could be included). Receiver 224A is sized and configured to slidably engage with first protrusion 212 and channel 216 and to support an ampoule within a support chamber 228 (an aperture 232 is sized and configured to receive first protrusion 212). The size and configuration of support chamber 228 is dependent on the size of ampoule to be broken, e.g., incorrect sizing can result in improper fracture of the ampoule because the ampoule does not remain in the proper position during the opening procedure. Receiver 224B is also sized and configured to slidably engage with first protrusion 212 and channel 216 and is generally used to support ampoule opener 200 when the ampoule opener is not in use.

First protrusion 212 serves to hold the ampoule to be broken in a defined position within channel 216 to ensure proper fracture of the ampoule head at the preferred break point (as discussed above with reference to FIG. 1). Aperture 232 and second protrusion 220 allows for alignment of an ampoule, which can be useful when the ampoule only includes a partially scored fracture point. In use, a user can align the fracture point (located between the ampoule head and body) with aperture 232 to appropriately break the head of the ampoule.

Figure 5:
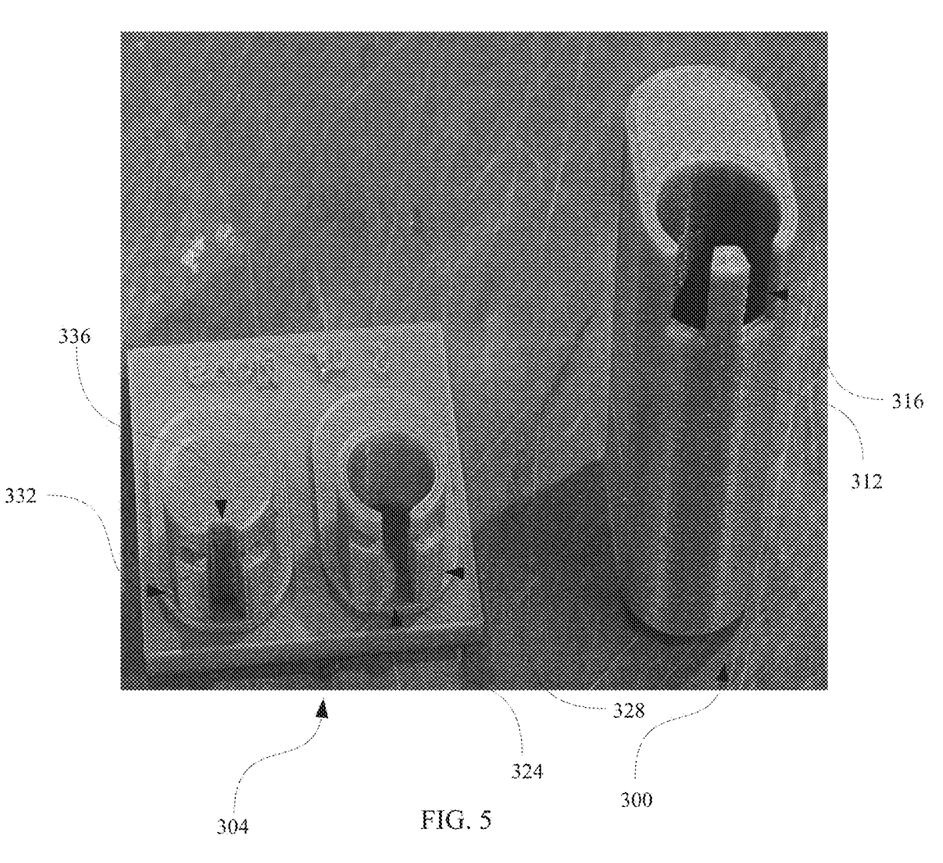
FIG. 5 is a perspective view of yet another exemplary ampoule opener with a base according to an embodiment of the present invention.

FIG. 5 shows yet another exemplary embodiment of an ampoule opener, ampoule opener 300, and a base 304. The primary differences between the ampoule opener 300 and those discussed above is the configuration of the keyway and the corresponding structures on the base 304. Ampoule opener 300 includes a keyway 308 that include a post 312 (which may be constructed similar to first protrusion 212 of FIG. 4) and on either side of the post, an aperture 316.

Base 304 includes a pair of receivers 320A and 320B. Receiver 320A includes an aperture 324 that is sized and configured to receive post 312. In this embodiment, receiver 320A also includes a pair of guides 328 that are designed and configured to mate with apertures 316. In general, each embodiment discussed herein provides the opportunity for the user to appropriately position the ampoule for breakage and to hold the ampoule after breakage has occurred to minimize spillage and the need to handle the ampoule.

In use, post 312 serves to hold the ampoule to be broken in a defined position within ampoule opener 300 to ensure proper fracture of the ampoule head at the preferred break point (as discussed above with reference to FIG. 1). Guides 328 and aperture 324 in receiver 320A allows for alignment of an ampoule, which can be useful when the ampoule only includes a partially scored fracture point. A user can align the fracture point (located between the ampoule head and body) with aperture 324 and guides 328 ensure that ampoule opener 300 is properly aligned to appropriately break the head of the ampoule. Receiver 320B also includes guides 332 that are designed similarly to guides 328 and a slot 336 for receiving post 312. During non-use, ampoule opener 300 can rest securely on receiver 320B.

Figure 6A:
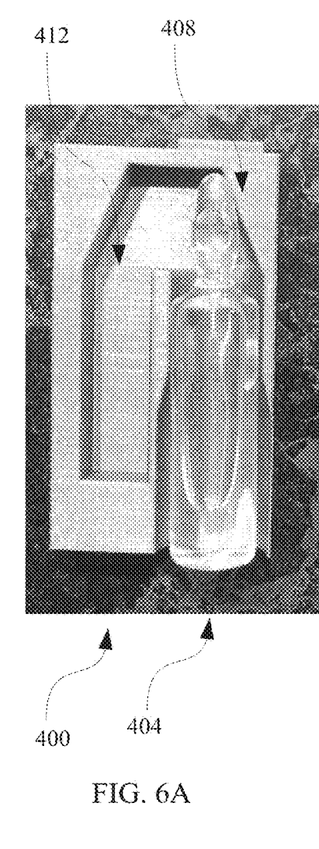
FIG. 6A-C are cut-away views of exemplary ampoule openers with a reference ampoule according to embodiments of the present invention.
Figure 6B:
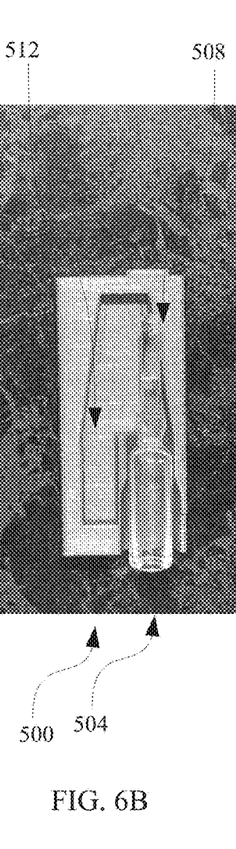
Figure 6C:
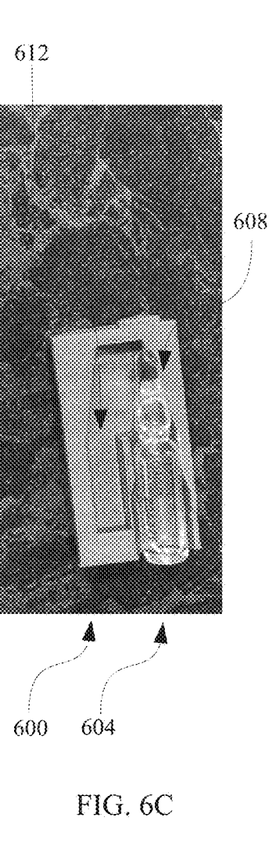

Turning now to FIGS. 6A-C, there are shown cut-away views of multiple exemplary embodiments of ampoule openers, i.e., ampoule openers 400, 500, and 600, each including the ampoule (i.e., ampoules 404, 504, and 604 respectively) that the ampoule opener has been designed to open. As shown, each ampoule has as different size and configuration. For example, ampoule 404 is larger and has a shorter length head than when compared to ampoule 504. Accordingly, the slope regions (i.e., slope regions 408, 508, and 608) and channels (where the ampoules are resting) are each sized and configured to correspond to the ampoule dimensions, as is the storage (i.e., storage 412, 512, and 612) for each ampoule opener (to allow for enough space for the ampoule head).

Figure 7:
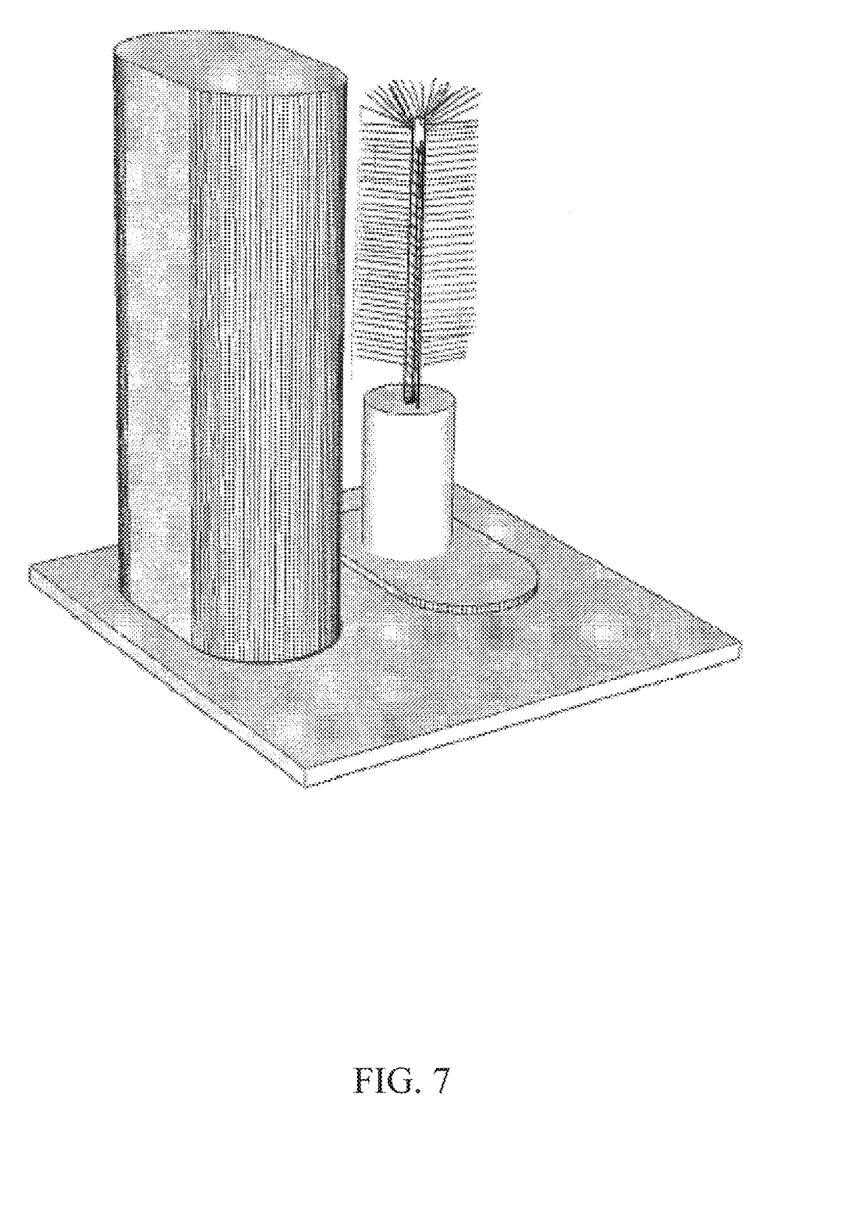
FIG. 7 is a perspective view of another exemplary ampoule opener with a base according to an embodiment of the present invention.

FIG. 7 shows another exemplary ampoule opener 700 and a base 704. Ampoule opener can be designed and configured similarly to exemplary ampoule openers discussed herein, e.g. ampoule openers 100, 200, and 300. Base 704 is similar to other bases discussed herein, however, base 704 includes a brush 708 on one of the receivers, e.g., receiver 712, (the other receiver is covered by ampoule opener 700. Brush 708 is designed and configured to clean the channel of the ampoule opener.

Figure 8:
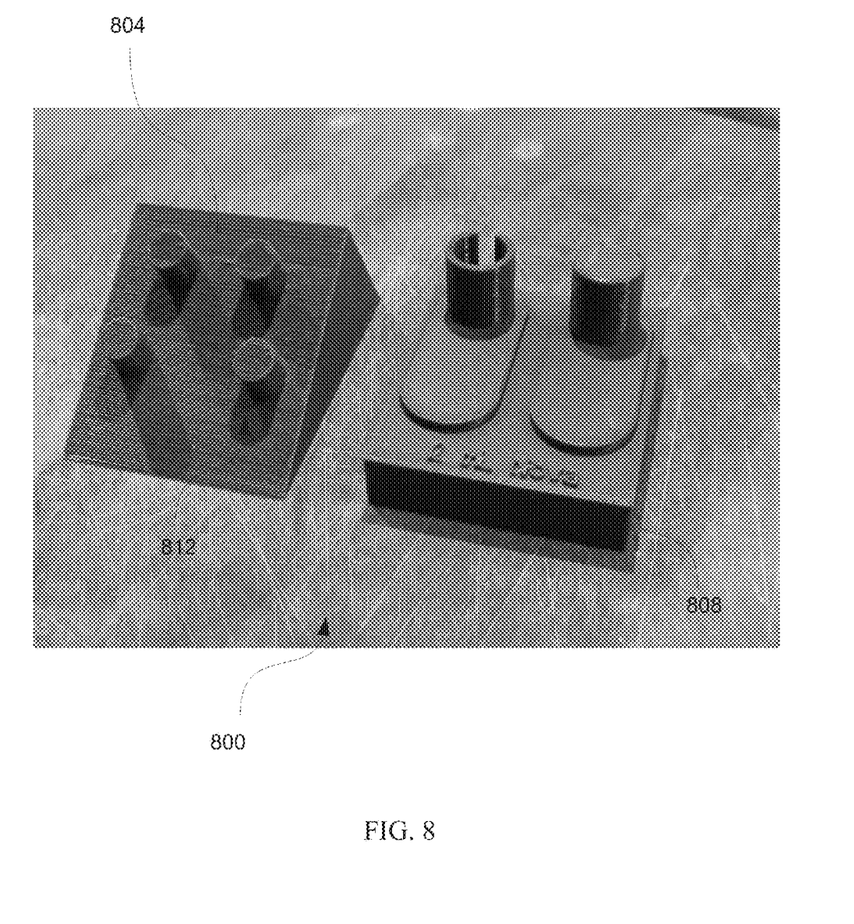
FIG. 8 is a perspective view of an exemplary base for an ampoule opener according to an embodiment of the present invention.

FIG. 8 shows an exemplary base 800 for use with one or more of the ampoule openers discussed herein. In an exemplary embodiment, base 800 is of two part construction, a flat portion 804 and an angled portion 808. Flat portion 804 can be designed similarly to other bases described herein (e.g., base 104), but include a plurality of apertures on its underside (not shown). Angled portion includes a plurality of stanchions 812 that mate with corresponding apertures in the underside of flat portion 804 (not shown) when assembled. When combined, flat portion 804 and angled portion 808 form an angled base, which facilitates extraction of the contents of an ampoule after opened by a ampoule owner, such as ampoule opener 100 (FIG. 1). Advantageously, base 800 allows a user to open the ampoule and extract contents without needing to move the ampoule from the opener to a slated station for extraction of the contents.

Figure 9:
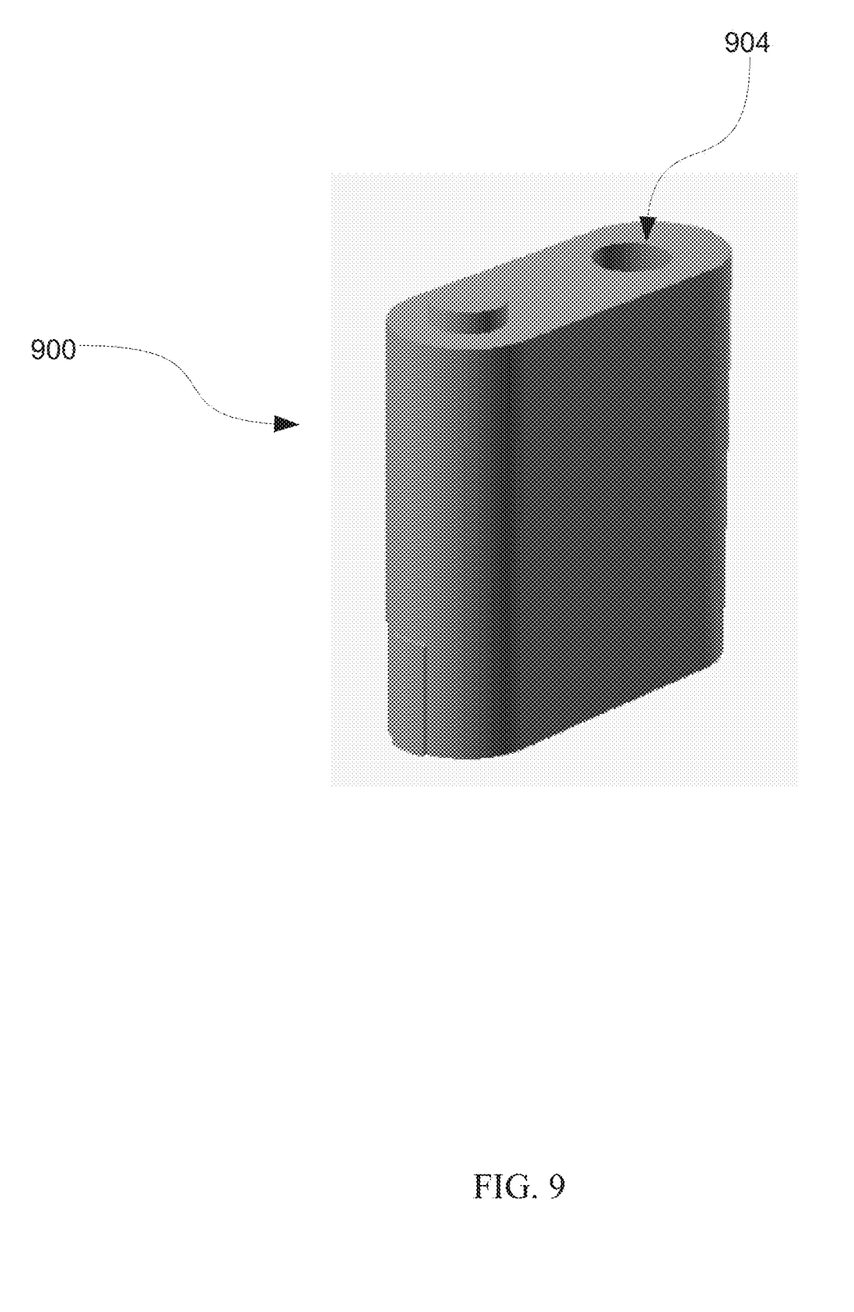
FIG. 9 is a perspective view of another exemplary ampoule opener according to an embodiment of the present invention.

FIG. 9 shows another exemplary embodiment of an ampoule opener 900. The internal design of ampoule opener 900 is similar to ampoule opener 100, however, ampoule opener 900 incorporates an ampoule head ejection portal 904. Ejection portal 904 facilitates the removal of ampoule heads or tops.

Figure 10:
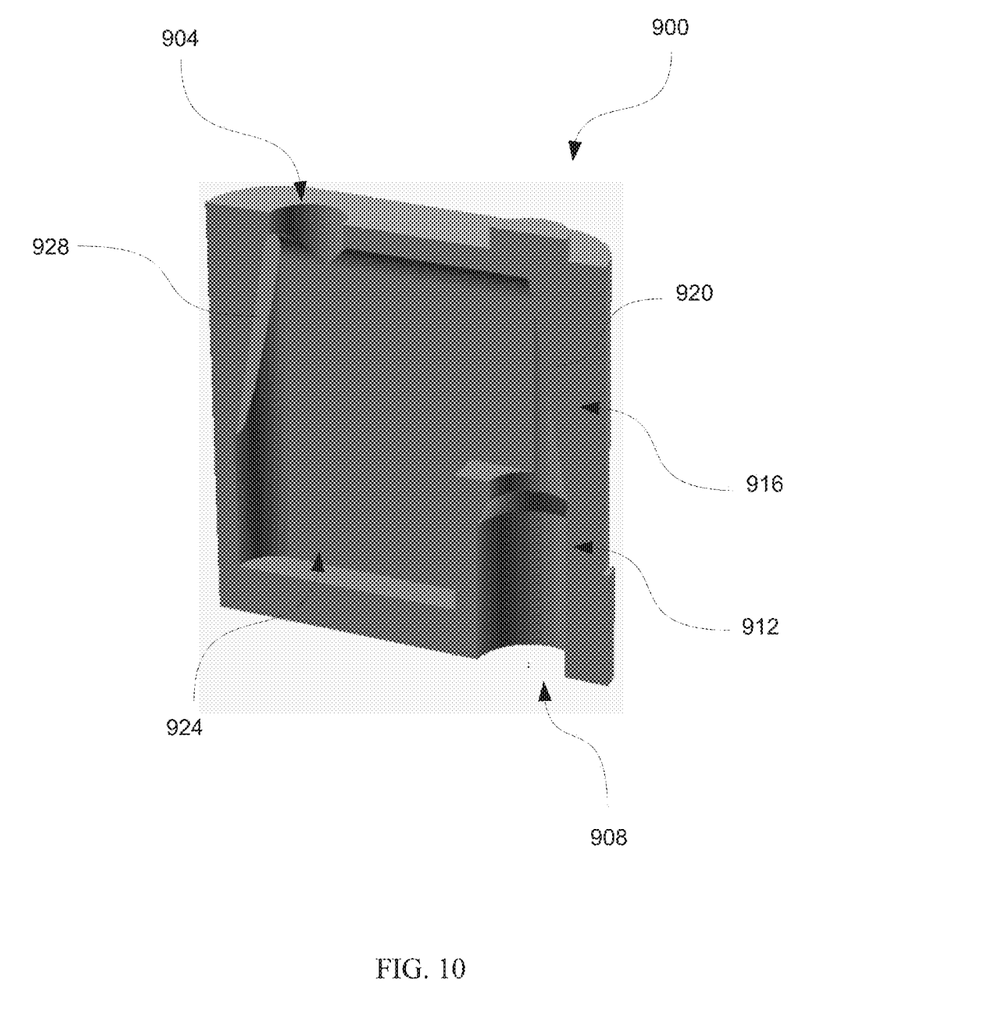
FIG. 10 is a cut-away view of the exemplary ampoule opener of FIG. 9.

FIG. 10 is a cut-away of ampoule opener 900. As shown, ampoule opener includes a keyway 908 and a channel 912 extending away from the entrance of keyway 908 and toward a breaking mechanism 916. In this embodiment, breaking mechanism 916 is a sloped region 920 with a predetermined angle and length corresponding to the ampoule to be broken. In use, as the user slides ampoule opener 900 onto a platform, such as platform 112 (FIG. 2) or another suitable platform (when used) or onto a counter, the head of the ampoule contacts sloped region 920 and eventually breaks as the head travels further toward the end of the sloped region. As noted above, the fracture point for the head of many ampoules is at a predetermined location, which is typically scored at least partially. So as to break the head at the preferred location, slope region 920 and channel 912 are sized and configured for discrete types and sizes of ampoules.

Ampoule opener 900 also includes a storage 924, which holds the broken heads of the ampoules. In use, as the user slides ampoule opener 900 toward a platform or the counter and the ampoule head breaks on breaking mechanism 916, the ampoule head is positioned to fall into storage 924 so that upon removal of the ampoule opener from the platform, the ampoule head remains in the ampoule opener. In this embodiment, the broken heads can be safely removed by upending ampoule opener 900 so that the ampoule heads fall toward ejection portal 904 located at an end of storage 924. In an exemplary embodiment, and as shown in FIG. 10, a sloped region 928 leads toward ejection portal 904 that facilitates removal of the ampoule heads when desired by a user.

Figure 11:
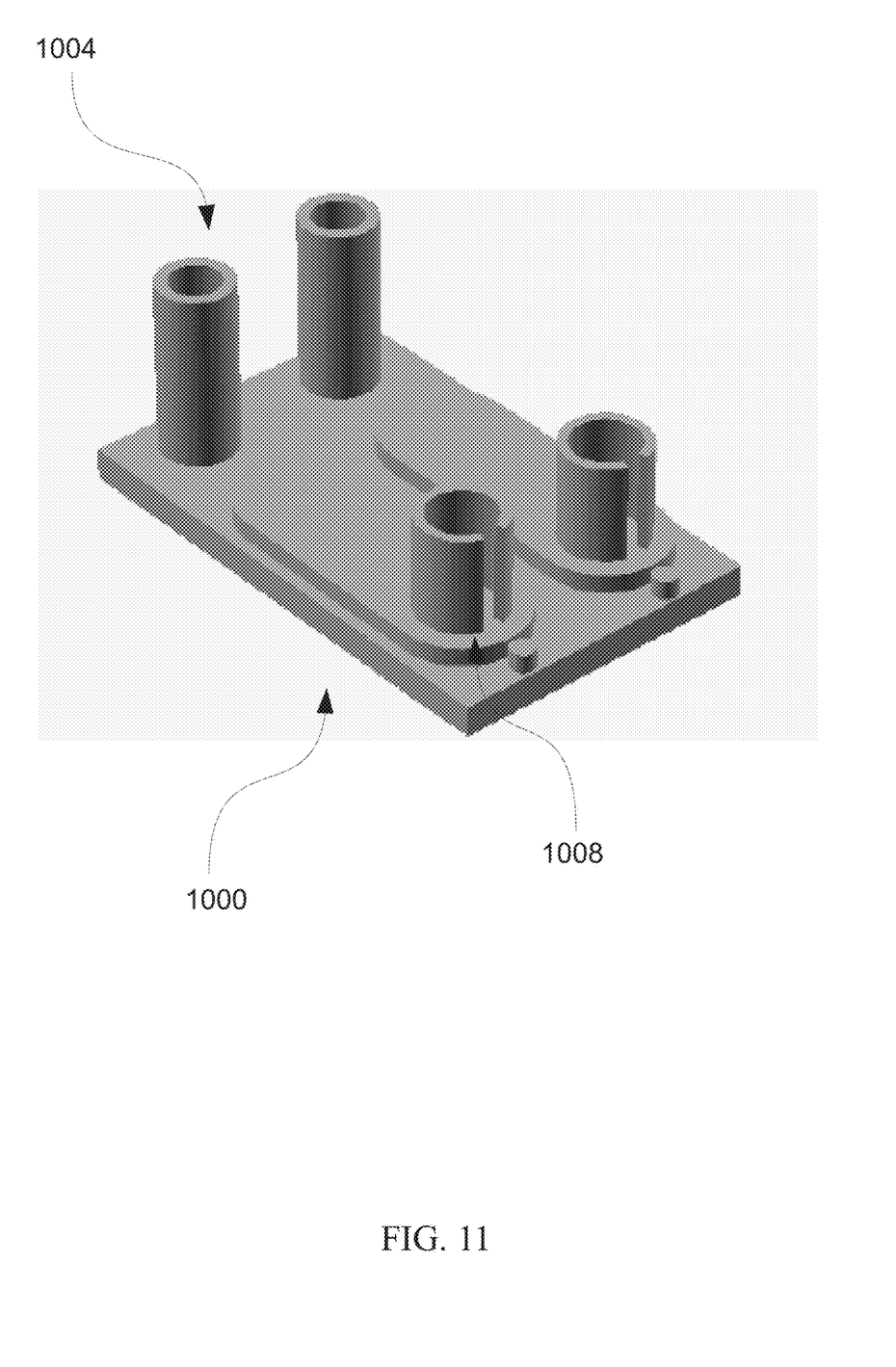
FIG. 11 is a perspective view of another exemplary base for an ampoule opener according to an embodiment of the present invention.

FIG. 11 shows another exemplary base 1000 suitable for use with one or more of the ampoule openers discussed herein. Base 1000 includes a plurality of needle holders 1004 and receivers 1008. Needle holders 1004 are designed and configured to hold a needles that may be used to extract the contents of an ampoule. Syringe holders 1004 can also provide a place to hold the needle cover once the needle is installed on the syringe. The cover can be removed by placing it in needle holder 1004 tip down and withdrawing the syringe combined with the needle. After a user is finished drawing the solution from the ampoule, the user can then reinstall the cover by guiding the tip of the needle back into the cover held by needle holder 1004. This configuration avoids the possibility that a user would stick themselves with the needle while attempting to reaffix the needle cover.

Receivers 1008 are designed and configured to hold ampoules and to properly position the ampoule opener or for ampoule opener storage, as discussed with reference to other receivers disclosed herein. Base 1000 provides additional utility for users by allowing the needle and ampoule to be stored proximate each other during use.

Figure 12:
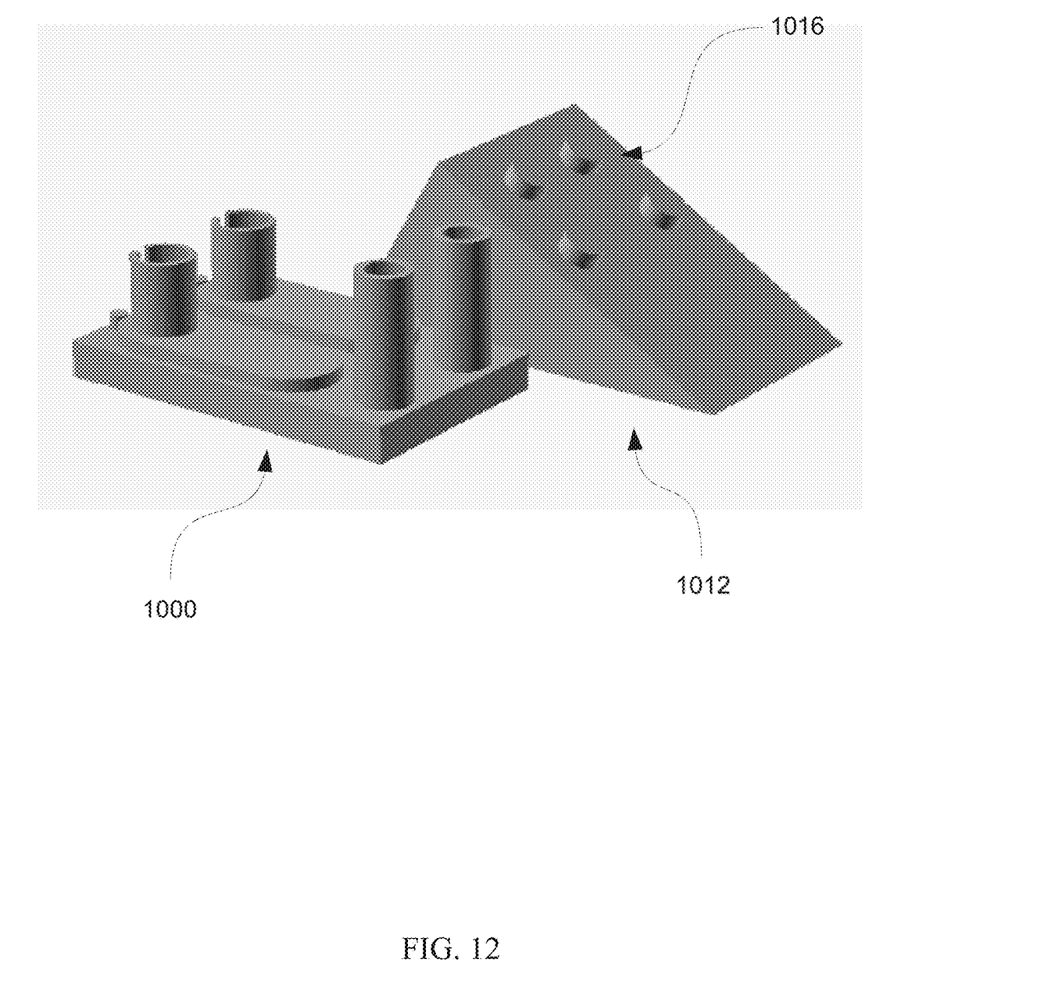
FIG. 12 is a perspective view of yet another exemplary base for an ampoule opener according to an embodiment of the present invention.

FIG. 12 shows base 1000 and stand 1012. Base 1000 and stand 1012 can be designed and configured such that the bottom of base 1000 securely attaches to stand 1012 via, for example, knobs 1016, however, other attachment mechanisms may be used. An advantage of the combination of base 1000 and stand 1012 is that the ampoules and the needles (in this embodiment) are position such that a user can more easy extract contents from the ampoule. It should be noted that while stand 1012 is shown as being substantially solid, less material can be used to form the stand by manufacturing the stand such that it is hollow.

Figure 13:
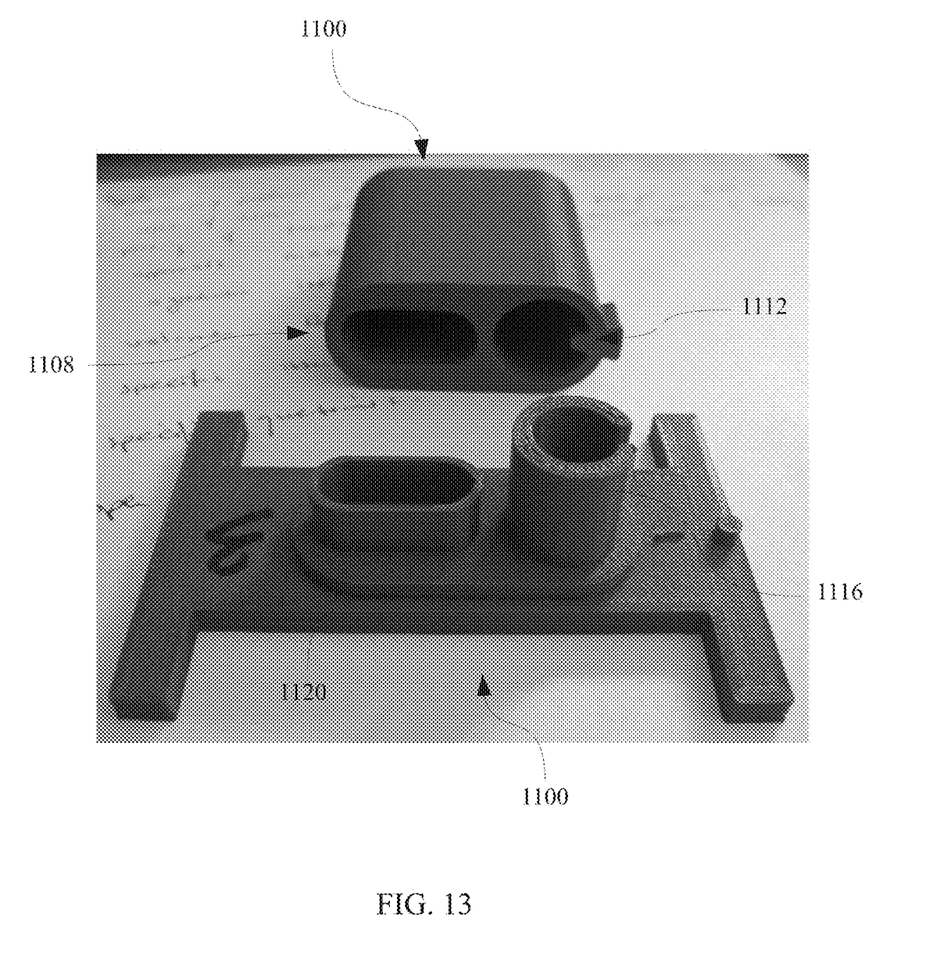
FIG. 13 is a perspective view of another exemplary ampoule opener and base according to an embodiment of the present invention.

FIG. 13 shows yet another embodiment of an ampoule opener and base, ampoule opener 1100 and base 1104. Ampoule opener 1100 is substantially similar to ampoule opener 200, but includes a discharge port 1108 proximate a keyway 1112. As shown, discharge port 1108 is a generally oblong opening in the bottom of ampoule opener 1100. Base 1104, in addition to having a receiver 1116, also includes a ampoule head receptacle 1120 that is size and configured to mate with discharge port 1108. In use, just after the user breaks the head of the ampoule, the head is discharged into the storage (e.g., see FIG. 3) and then falls through discharge port 1108 to be held by ampoule head receptacle 1120. The user can then lift ampoule opener 1100 off of base 1104 to expose the broken ampoule and the safely stored ampoule head. The size and configuration of discharge port 1108 and its mating partner, receptacle 1120, can be a function of the type of ampoule to be broken and its size.

In a first exemplary aspect an ampoule opener for breaking the head off an ampoule at a predetermined location, the ampoule opener comprises a housing including a keyway; a channel extending from said keyway to a breaking mechanism, wherein said breaking mechanism includes a slope region having an angle and length that corresponds to the head of the ampoule; and a storage, wherein said storage is formed within said housing and in communication with said channel, and wherein said storage receives the head of the ampoule after broken off the ampoule. The ampoule opener, as described herein, wherein said keyway includes a channel sized and configured to securely hold the ampoule. The ampoule opener, as described herein, wherein said keyway includes a first protrusion extending into said channel. The ampoule opener, as described herein, wherein said keyway includes a second protrusion, said second protrusion projecting away from said channel. The ampoule opener, as described herein, further including a base having a receiver, said receiver designed to mate with said keyway. The ampoule opener, as described herein, wherein said keyway includes a channel sized and configured to securely hold the ampoule. The ampoule opener, as described herein, wherein said keyway includes a first protrusion extending into said channel. The ampoule opener, as described herein, wherein said receiver includes an aperture, said aperture designed and configured to mate with said first protrusion. The ampoule opener, as described herein, wherein said base includes a needle holder. The ampoule opener, as described herein, wherein said base includes a plurality of receivers. The ampoule opener, as described herein, wherein at least one of said plurality of receivers includes an aperture for guiding the ampoule opener when opening the ampoule and another of said plurality of receivers includes a channel for guiding the ampoule opener into a storage position. The ampoule opener, as described herein, wherein said housing includes an exit port opposite from said keyway. The ampoule opener, as described herein, wherein said base includes a slanted portion and a flat portion, wherein said slanted portion and said flat portion can be removably coupled together to form a slanted base. The ampoule opener, as described herein, wherein said housing includes a discharge port in the bottom thereof, said discharge port in communication with said storage and proximate said keyway. The ampoule opener, as described herein, further including a base having a receptacle sized and configured to mate with said discharge port during use of the ampoule opener.

In another exemplary aspect, an ampoule opening system for breaking the head off an ampoule at a predetermined location comprises an ampoule opener including: a housing including a keyway; a channel extending from said keyway to a breaking mechanism, wherein said breaking mechanism includes a slope region having an angle and length that corresponds to the head of the ampoule; and a storage, wherein said storage is formed within said housing and in communication with said channel, and wherein said storage receives the head of the ampoule after broken off the ampoule; and a base including a plurality of receivers, wherein at least one of said receivers supports the ampoule before and after breaking the head of the ampoule with said ampoule opener. The ampoule opening system, as described herein, wherein said keyway includes a channel sized and configured to securely hold the ampoule. The ampoule opening system, as described herein, wherein said keyway includes a first protrusion extending into said channel. The ampoule opening system, as described herein, wherein said keyway includes a second protrusion, said second protrusion projecting away from said channel. The ampoule opening system, as described herein, wherein said at least one of said receivers is configured to mate with said keyway. The ampoule opening system, as described herein, wherein said keyway includes a channel sized and configured to securely hold the ampoule. The ampoule opening system, as described herein, wherein said keyway includes a first protrusion extending into said channel. The ampoule opening system, as described herein, wherein each of said plurality of receivers include an aperture, said aperture designed and configured to mate with said first protrusion. The ampoule opening system, as described herein, wherein said base includes a needle holder. The ampoule opening system, as described herein, wherein said base includes a slanted portion and a flat portion, wherein said slanted portion and said flat portion can be removably coupled together to form a slanted base. The ampoule opening system, as described herein, wherein said housing includes an exit port opposite from said keyway. The ampoule opening system, as described herein, wherein said housing includes a discharge port in the bottom thereof, said discharge port in communication with said storage and proximate said keyway. The ampoule opening system, as described herein, wherein said base includes a receptacle sized and configured to mate with said discharge port during use of the ampoule opener.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An ampoule opener for breaking the head, off an ampoule containing a liquid at a predetermined location, the ampoule opener comprising:
   a housing having a bottom, the housing including:
      a keyway disposed on the bottom:
      a channel extending from said keyway up to a breaking mechanism, wherein said breaking mechanism includes a slope region having an angle and length that corresponds to the head of the ampoule, and wherein the head of the ampoule is broken off by inserting the ampoule into said housing via said channel such that the head of the ampoule makes contact with said breaking mechanism; and
      a storage, wherein said storage is formed within said housing and in communication with said channel, and wherein said storage receives the head of the ampoule after being broken off the ampoule and, when the housing is in an upright position, the broken off ampoule head remains in the storage when the ampoule is removed from the ampoule opener such that a user can access the liquid residing inside the ampoule.

2. An ampoule opener according to claim 1, wherein said keyway includes a channel sized and configured to securely hold the ampoule.

3. An ampoule opener according to claim 2, wherein said keyway includes a first protrusion extending into said channel.

4. An ampoule opener according to claim 3, wherein said keyway includes a second protrusion, said second protrusion projecting away from said channel.

5. An ampoule opener according to claim 1, further including a base having a receiver, said receiver designed to mate with said keyway.

6. An ampoule opener according to claim 5, wherein said keyway includes a channel sized and configured to securely hold the ampoule.

7. An ampoule opener according to claim 6, wherein said keyway includes a first protrusion extending into said channel.

8. An ampoule opener according to claim 7, wherein said receiver includes an aperture, said aperture designed and configured to mate with said first protrusion.

9. An ampoule opener according to claim 5, wherein said base includes a needle holder.

10. An ampoule opener according to claim 5, wherein said base includes a plurality of receivers.

11. An ampoule opener according to claim 10, wherein at least one of said plurality of receivers includes an aperture for guiding the ampoule opener when opening the ampoule and another of said plurality of receivers includes a channel for guiding the ampoule opener into a storage position.

12. An ampoule opener according to claim 5, wherein said base includes a slanted portion and a flat portion, wherein said slanted portion and said flat portion can be removably coupled together to form a slanted base.

13. An ampoule opener according to claim 1, wherein said housing includes an exit port opposite from said keyway.

14. An ampoule opener according to claim 1, wherein said housing includes a discharge port in the bottom thereof, said discharge port in communication with said storage and proximate said keyway.

15. An ampoule opener according to claim 14, further including a base having a receptacle sized and configured to mate with said discharge port during use of the ampoule opener.

16. An ampoule opening system for breaking the head off an ampoule containing a liquid at a predetermined location comprising:
an ampoule opener including:
a housing having a top surface and a bottom surface, the housing including a keyway disposed on the bottom surface and wherein the top surface does not include any apertures;
a channel extending from said keyway to a breaking mechanism, wherein said breaking mechanism includes a slope region having an angle and length that corresponds to the head of the ampoule; and
a storage, wherein said storage is formed within said housing and in communication with said channel, and wherein said storage receives the head of the ampoule after being broken off the ampoule; and
a base including a plurality of receivers, wherein at least one of said receivers supports the ampoule before and after breaking the head of the ampoule with said ampoule opener,
wherein the head of the ampoule is broken off by inserting the ampoule into said housing via said channel such that the head of the ampoule makes contact with said breaking mechanism and, when the housing is in an upright position, the broken off ampoule head remains in the storage when the ampoule is removed from the ampoule opener such that a user can access the liquid residing inside the ampoule.

17. An ampoule opener according to claim 16, wherein said keyway includes a channel sized and configured to securely hold the ampoule.

18. An ampoule opener according to claim 17, wherein said keyway includes a first protrusion extending into said channel.

19. An ampoule opener according to claim 18 wherein said keyway includes a second protrusion, said second protrusion projecting away from said channel.

* * * * *